United States Patent [19]
Akhteruzzaman

[11] Patent Number: 6,104,795
[45] Date of Patent: Aug. 15, 2000

[54] METHOD AND APPARATUS FOR DETECTING AND ANNOUNCING PIN FRAUD ON COIN TELEPHONES THAT USE BATTERY REVERSAL PULSES TO METER CHARGES

[75] Inventor: Akhteruzzaman, Naperville, Ill.

[73] Assignee: Lucent Technologies Inc., Murray Hill, N.J.

[21] Appl. No.: 09/206,192

[22] Filed: Dec. 4, 1998

[51] Int. Cl.[7] .................................................. H04M 17/00
[52] U.S. Cl. ........................ 379/145; 379/151; 379/147; 379/154
[58] Field of Search .................................... 379/145, 146, 379/148, 149, 150, 151, 152, 153, 154

[56] References Cited

U.S. PATENT DOCUMENTS

| | | | |
|---|---|---|---|
| 4,039,768 | 8/1977 | O'Maley | 179/175.2 |
| 4,759,054 | 7/1988 | Mellon | 379/145 |
| 4,860,346 | 8/1989 | Mellon | 379/155 |
| 4,862,494 | 8/1989 | Matheny | 379/145 |
| 5,022,073 | 6/1991 | Jordan | 379/145 |
| 5,465,293 | 11/1995 | Chiller et al. | 379/189 |
| 5,757,896 | 5/1998 | Akhteruzzaman et al. | 379/145 |
| 5,864,618 | 1/1999 | Seitz et al. | 379/419 |
| 5,907,606 | 5/1999 | Ingalsbe et al. | 379/146 |
| 5,956,635 | 9/1999 | Hoogerwerf et al. | 455/411 |
| 5,978,460 | 11/1999 | Butts et al. | 379/145 |

Primary Examiner—Curtis A. Kuntz
Assistant Examiner—Barry W. Taylor
Attorney, Agent, or Firm—Jack R. Penrod

[57] ABSTRACT

Pin fraud of battery reversal pulse metered sophisticated coin telephones is detected, an announcement of the detected fraud made, and the fraud is stopped if the detected fraud continues by the method and apparatus of the invention. By carefully monitoring within the switch office the loop current that is flowing in the 48 volt battery circuit, especially in the more positive terminal portion of the 48 volt battery circuit, loss of current to a fraud ground at a remote coin telephone can be detected. Once a fraud ground is detected, an announcement is made to at least the calling station where the pin fraud was detected, which says in effect "The pay telephone you are using is charging improperly for the service provided. If such improper charging continues the present call will be discontinued." A convenient location in the switch office and an inexpensive component configuration make the addition of this pin fraud detection, announcement and prevention apparatus very cost effective.

7 Claims, 2 Drawing Sheets

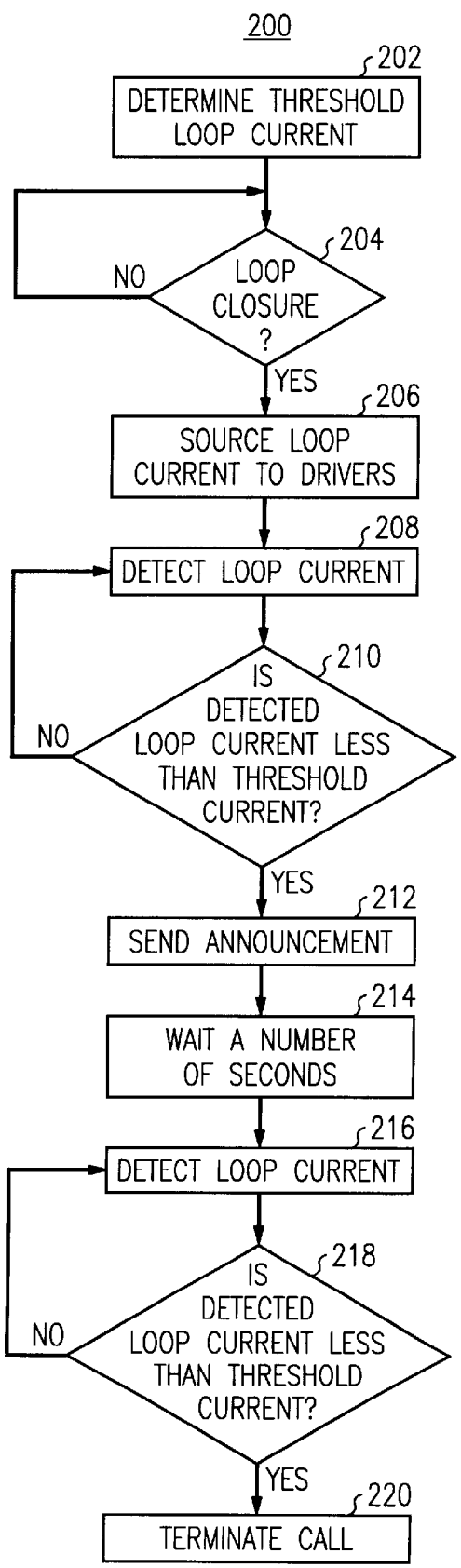

METHOD AND APPARATUS FOR DETECTING AND ANNOUNCING PIN FRAUD ON COIN TELEPHONES THAT USE BATTERY REVERSAL PULSES TO METER CHARGES

TECHNICAL FIELD

The invention relates to a method and apparatus for preventing coin telephone fraud and more particularly to a method and apparatus for preventing pin fraud on a coin telephone system which uses battery reversal pulses to meter the charges at the coin telephone. Such coin telephone systems are found in Taiwan, R.O.C. and various other locations of the world.

DESCRIPTION OF THE PRIOR ART

Coin telephones, some varieties of which are also known as pay telephones, are usually connected to a local telecommunication switch. The local switch routes the call (at least in part) to the called party and oversees the charging of the call originator for the call. If the called party is sufficiently removed from the coin telephone, timed charges are typically made. The acceptance of payment at the coin telephone is controlled from the local switch by control signals and/or control signal sequences. Certain illegal actions may be taken by an unscrupulous caller to hide, block or mimic the control signals from the local switch in order to defraud the local telephone service provider and obtain free or reduced cost telephone calls from coin telephones. Because in one well known technique a pin is used to pierce part of the handset or the handset cord in order to ground either the tip conductor or the ring conductor, this type of fraud is commonly known as pin fraud.

In the United States, collection of coins for a call is made by operation of a fairly substantial voltage pulse that actuates a mechanical device at the coin telephone. Pin fraud of coin telephones in the United States can interrupt the normal coin collection and cause deposited coins to be returned to the fraud perpetrator after the pin fraud device is removed and an incomplete local call attempted. This type of pin fraud is described in U.S. Pat. Nos. 5,022,073 issued Jun. 4, 1991 to Jordan; 4,989,239 issued Jan. 29, 1991 to McGarry; and 4,862,494 issued Aug. 29, 1989 to Matheny. The other part of pin fraud, which includes fraudulently inducing a dial tone and a free local call, is not applicable to modern "dial tone first" coin telephones now in service in the United States.

Some countries of the world, such as Taiwan, use a different, more sophisticated type of coin telephone. They are more sophisticated in that these coin telephones provide for their own coin collection. The local switch thus only must provide audio path plus time metering current pulses that tell the sophisticated coin telephone when a unit charge to the calling party has been incurred. These metering current pulses are sent along the same two wires that carry the audio signals. Pin fraud for these sophisticated coin telephones entails the use a pin to ground the tip lead or conductor at the coin telephone. This grounding shunts enough of each metering pulse to prevent the self-operating coin collection circuitry of the sophisticated coin telephone from detecting its occurrence. Thus, the service fee charging circuitry is defrauded into never charging more than the initial fee, which means fees for long calls and/or long distance calls go uncollected. This type of pin fraud costs telephone companies in Taiwan, R.O.C. millions of dollars per year. One method and apparatus for detecting and discontinuing such pin frauds is given in U.S. Pat. No. 5,757,896, by Akhteruzzaman et al., which is hereby incorporated by reference. Even though the apparatus of Akhteruzzaman et al. is works, the local telephone companies would rather encourage their service users, even pin fraud perpetrators, to make telephone calls responsibly by paying for the call and to leave the coin telephones in condition for use by the next user. Thus, there is a need in the coin telephone art for a method and apparatus for detecting pin fraud conditions, and then encouraging the pin fraud perpetrator to remove the pin fraud and pay for the call.

Solution

The aforementioned problems are solved and an advance in the art is achieved by providing an apparatus for detecting and comparing an amount of current sourced from within the telecommunication switch to the tip and ring drivers to a predetermined threshold current, and if the detected amount of current sourced from within the telecommunication switch to the tip and ring drivers is less than the predetermined threshold current, then a ground current indicating a pin fraud at the coin telephone has been determined. After a pin fraud has been determined, an announcement is transmitted by the apparatus to the pin fraud perpetrator that pin fraud has been detected. This announcement encourages the pin fraud perpetrator to remove the pin fraud. If the pin fraud perpetrator complies with the announcement, the apparatus allows the call that is no longer a pin fraud call to continue and discontinues any pin fraud call that continues as a pin fraud call.

In a specific embodiment, the aforementioned problems are solved by providing an apparatus for detecting an improper ground. This apparatus includes a ground connection terminal that is connected to more positive input of a ring voltage driver and also to a more positive input of a tip driver. A current detector senses an amount of current flowing from the first ground terminal to the tip and ring drivers. The ring driver and the tip driver each has a more negative input which is connected to a more negative voltage. The tip driver has an output terminal which is connected to a first lead of a first current detecting impedance. The second lead of the first current detecting impedance is connected to a first conductor. A coin telephone is also connected to the first conductor at a tip connection thereof at a distance from the first current detecting impedance. The ring driver also has an output terminal which is connected to a first lead of a second current detecting impedance. The second lead of the second current detecting impedance is connected to a second conductor. The coin telephone is also connected to the second conductor at a ring terminal thereof at a distance from the second current detecting impedance. The current detector detects an unauthorized connection between the tip conductor and ground if the amount of current flowing from the ground terminal drops below a pre-determined threshold. When such an unauthorized connection is detected, an announcing unit, which is connected to the current detector for announcing to the coin telephone user that an improper ground has been detected, announces that any present call involved with the coin telephone will be discontinued if the unauthorized connection continues for a set period of time. A timer, which is connected to the current detector, times the set period and if an improper ground is detected by the detector at the end of the set period the telephone call involving the coin telephone is disconnected.

According to another aspect of the invention, the aforementioned problems are solved by providing a method of detecting at a telecommunication switch a service fee collection disabling ground current at a telephone at a location that is remote to the telecommunication switch. The method includes the steps of determining a threshold loop current that is the lowest average amount of current that flows in a normal loop for an off-hook condition of the telephone, detecting an average amount of current that flows in a present loop for an off-hook condition of the telephone, and comparing the lowest average amount of current of the normal loop with the amount of current of the present loop for an off-hook condition of the telephone, announcing to the telephone that the fee-collection-disabling-ground has been detected and if this ground exists after a set period of time any call to the telephone will be disconnected, timing the set period of time upon detecting the ground, and disconnecting any call with the telephone if the fee-collection-disabling ground exists after the set period of time is over.

BRIEF DESCRIPTION OF THE DRAWING

FIG. 2 is a logic flow diagram of a method for practicing the invention.

DETAILED DESCRIPTION

Figure 1:
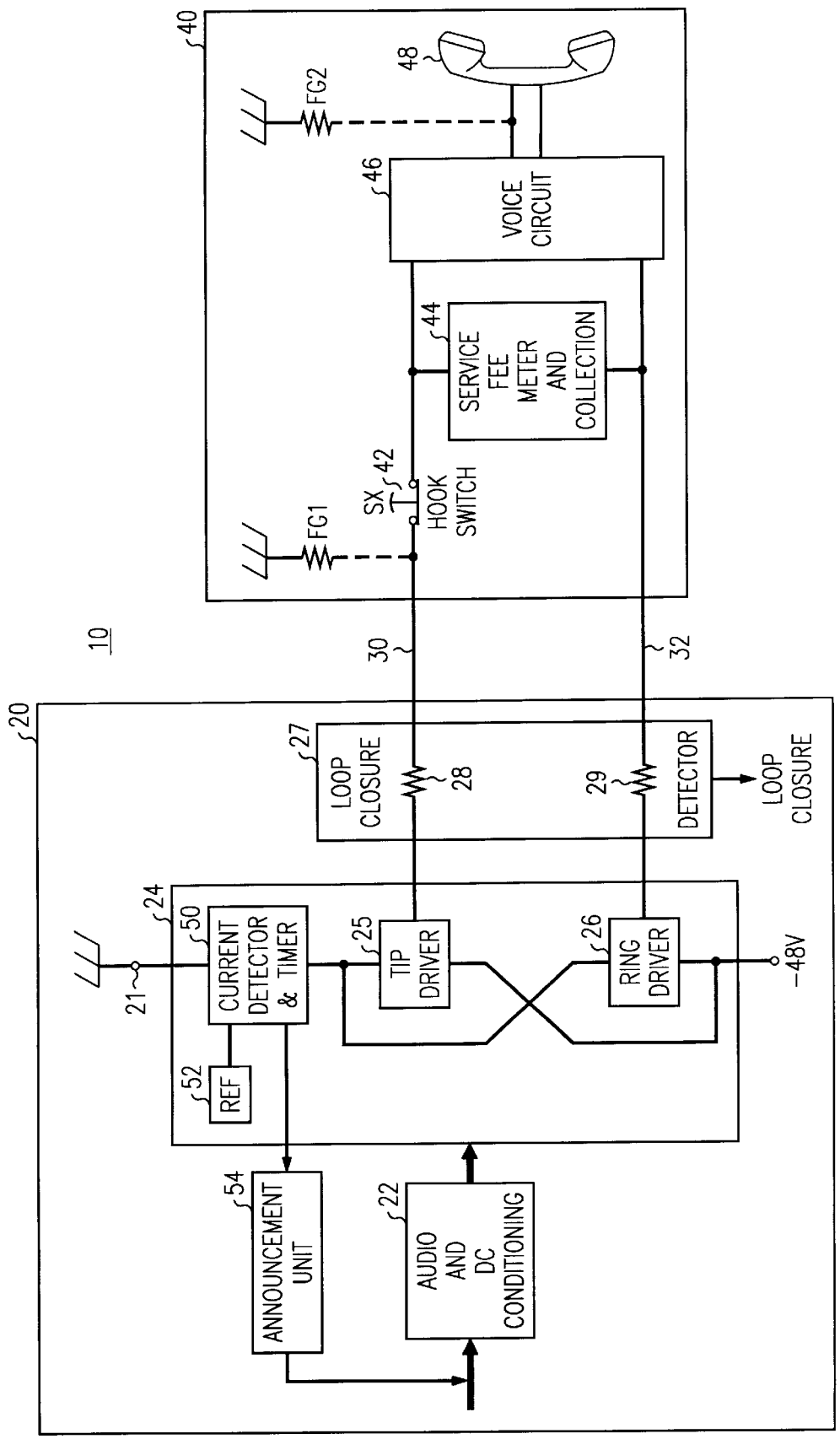
FIG. 1 is a block diagram of a system for practicing aspects of the invention.

Referring to FIG. 1, an overall system 10 for making a coin telephone call is shown in block diagram form. Overall system 10 has a telecommunication switch 20 which is connected via tip and ring lines 30, 32 to a remote coin telephone 40. Lines 30, 32 may be simple wire conductors. The lines 30, 32 carry a composite signal that is made up of a loop current which flows when the hookswitch 42 is closed and the telecommunication switch 20 has not deactivated lines 30, 32 because of some past problem, such as an inadvertent left off-hook condition. This loop current is normally constant in magnitude, but for coin telephones, such as coin telephone 40, the direction of the current is briefly reversed by what is known in the art as a battery reversal. The purpose of these current reversals is to indicate when a fee for a call is due, as will be explained below. Superimposed on the loop current is an audio signal which typically carries the voices of the calling party and the called party. The operation of this audio signal is well known and will not be discussed further except to note that it is usually the reason each coin telephone call is made.

The coin telephone 40 is of the type that is used in Taiwan, R.O.C. and other nations. It is different from the coin telephones commonly used in the United States because it has no escrow bin where coins are held that may be returned if a call is not completed or if charges are reversed. Because of the lack of an escrow bin, the coin telephone 40 does not need the collect escrow coins signals or the refund escrow coins signals which are the major pin fraud problem in the United States. Further, the coin telephones in the United States originally used human operators to announce service fees, count the number and amounts of coins as well as collect the coins. Thus, historically a central operator position provided all the intelligence to charge and collect the fees for the service of making a call from a coin telephone. That central operator position was an early object of automation, which resulted in the United States having central, computer controlled operator position systems performing the coin telephone tasks that had previously been performed by human operators.

Sophisticated coin telephone 40 reflects a different approach that other telephone companies in other parts of the world have taken to coin telephone operation. Coin telephone 40 has a service fee meter and collection unit 44 instead of the coin escrow bin and collection bin common in the United States. The service fee meter and collection unit 44 is fairly autonomous in its charging and collecting of coins. Thus, this type of coin telephone uses more distributed automation than that commonly used in the United States. The telecommunication switch 20 supplies loop closure detection, dialed number collection, call setup and call tear-down for the coin telephone 40 in the way it provides those same services for non-coin telephones. The major difference is that the lines 30, 32 are identified as lines connected to a coin telephone, so the telecommunication switch 20 sends out current reversal pulses as the coin telephone call progresses to indicate to the service fee meter and collection unit 44 that another unit of service has been supplied by the telephone company and the coin telephone should collect a corresponding service fee in order to receive compensation for providing the coin telephone service and facilities. The current reversal used is a pulse of approximately 100 milliseconds and then the loop current is returned to the normal current flow direction. The current reversal has negligible effect on the voice circuits 46 or the handset 48.

Telecommunication switch 20 has switching circuits for telephone call set-up, routing, completion and tear-down. All of these are well known and, except as the routing determines the service fee schedule and service fee pulse initiating, are an incidental part of the present invention. Thus, they are not shown in FIG. 1.

Telecommunication switch 20 has audio and d.c. conditioning circuit 22 which respectively input the audio portion and the d.c. portion of the composite electrical signal to driver circuit 24. Driver circuit 24 amplifies the composite electrical signal and drives loop closure detector 27 with the amplified composite electrical signal. Audio and d.c. conditioning circuit 22 develops inputs to driver circuit 24 which provides for an audio portion of a call from another station (not shown) that is eventually presented to the earpiece of handset 48 and for a d.c. loop current which can be reversed in order to ultimately instruct service fee meter and collection unit 44 to collect a service fee. Driver 24 receives these inputs and uses tip driver 25 and ring driver 26, which may be integrated circuits, to amplify and drive the audio signal and the loop current around the loop formed by loop closure detector 27, lines 30, 32 and coin telephone 40.

Loop closure detector 27 has two impedances 28 and 29 which detect when hook switch 42 closes, e.g. by handset 48 being lifted off-hook. When hook switch 42 is open for many seconds the audio signals are disconnected by removal of any previous call and d.c. loop current cannot flow. For this open hook switch condition, normally the output of the tip driver 25 is near ground potential and the output of the ring driver 26 is near −48 volts. Upon going off-hook from the on-hook condition, loop current flows out of the tip driver 25, through impedance 28, line 30, coin telephone 40, line 32, impedance 29 into the output of ring driver 26. Loop closure circuit 27 senses the current in impedances 28 and 29 to determines from both of the sensed currents if hook switch 42 goes to an off-hook condition. Very little leakage occurs in lines 30, 32 and the coin telephone 40, so the magnitude of the current flowing through impedance 28 is essentially the same as the magnitude of the current flowing through impedance 29. A current imbalance detection between impedance 28 and impedance 29 is one way to practice the present invention and detect a fraud ground; however, the higher voltage levels, differential reference and the component ruggedness required because of environmental electrostatic discharges, e.g. lightning, means this would be a higher cost implementation than locating the current detector closer to ground terminal 21.

Since there is some difficulty in measuring loop currents at various locations around the loop in order to determine loop closure status, one embodiment of the present invention to detect pin fraud uses the level of current flowing from ground terminal 21 to tip driver 25 during normal current flow or to ring driver 26 during reverse current flow. To measure the amount of current flowing out of ground terminal 21, current detector 50 is used. Current detector 50 has a current sensor which may be a small valued impedance, such as a resistor, to turn the current into a voltage in a predictable way or it may be an induction coil or hall effect device that measures the magnetic field produced by the loop current. Any of these devices takes such a small amount of energy that it has a negligible effect on the overall operation of the loop circuit. In addition, current detector 50 has a detection circuit, which in the embodiment shown in FIG. 1 is a comparator (not shown). This comparator compares the voltage developed across the current sensor and compares it to a reference 52. If the voltage developed across the current sensor is less than the reference 52, then the comparator changes state and a pin fraud has been detected. Once a pin fraud has been detected, service is cut off. This service cut off may be by cutting off the loop current, by cutting off the audio, or by some other means.

Pin fraud is perpetrated by first establishing a coin telephone call in the usual manner and then inserting a fraud ground into the tip driver portion of the loop circuit. The typical location for a fraud ground is as the tip line 30 connects to the coin telephone 40. This is shown by a small valued resistor, FG1, which is connected to ground and to conductor 30. The connection to tip line 30 is represented by a dashed line to indicate that the fraud ground FG1 is added after the call is initially established. An alternate location for a fraud ground is at the tip side of the lines that connect the handset 48 to the voice circuit 46. This is shown by small valued resistor FG2, which is connected to ground and to the tip side line to handset 48. The connection to the tip side line is represented by a dashed line to indicate that the fraud ground FG2 is added after the call is initially established.

After a call has been established from coin telephone 40, telecommunication switch 20 transmits service fee metering pulses. These pulses are typically 100 milliseconds long. The service metering pulses, as mentioned before, are pulses of reversed loop current. Normally, the tip driver 25 is driven such that its output is approximately ground, and the ring driver 26 is driven such that its output is approximately −48 volts. During each service fee metering pulse, the tip driver is driven such that its output is approximately −48 volts, and the ring driver 26 is driven such that its output is approximately ground. Service fee meter and collection unit 44 uses the reversal of the current or the reversal of the voltage between lines 30 and 32 as an indication that another amount of money should be charged and collected. If coins are appropriately inserted to pay for the call, the call is continued, otherwise service fee meter and collection unit 44 cuts off service to handset 48.

If either fraud ground FG1 or FG2 is inserted after a call is established, during normal operation there will be essentially no potential difference between ground terminal 21 and fraud ground FG1 or FG2, and substantially reduced current will flow through ground terminal 21, current detector 50, tip driver 25, loop closure impedance 28 and tip line 30. In such a case, fraud ground FG1 or FG2 operates as the source of the current flowing through service fee meter and collection unit 44, voice circuit 46, handset 48, ring line 32, loop current detector 29, ring driver 26 to −48 volt terminal. During reverse current operation, there will be essentially no potential difference between ground terminal 21 and fraud ground FG1 or FG2 and there will be substantially reduced current flowing through ground terminal 21, current detector 50, ring driver 26, loop closure impedance 29, ring conductor, service fee meter and collection unit 44, voice circuit 46 to fraud ground FG1 or FG2. Fraud ground FG1 or FG2 will act as a source of the current flowing from FG1 or FG2 through ring line 30, loop closure impedance 28, tip driver 25 to −48 volt terminal. During the current reversal there is negligible voltage and negligible current flowing through service fee meter and collection unit 44, which has the effect of disabling the operation of the current reversal metering pulses transmitted by telecommunication switch 20, thereby fraudulently limiting a fee for a coin telephone call to the fee that is collected before the fraud ground FG1 or FG2 is inserted.

It is worth noting that for a fraud ground situation, a great majority of the current flowing is sourced from the fraud ground FG1 or FG2 at the coin telephone location instead ground terminal 21 in the telecommunication switch 20. This is true of both normal loop current flow and reverse loop current flow. Thus, by carefully monitoring the current flowing from ground terminal 21 with current detector and timer 50 and reference 52, a pin fraud is detected whenever a fraud ground FG1 or FG2 provides a bypass source of current. For such a case, the current through the current sensor of current detector and timer 50 will have reduced output. The reduced output will be less than the minimum loop current represented by threshold reference 52 and the comparator within current detector and timer 50 will change state and indicate the presence of a fraud ground, or an open loop condition (i.e. an on-hook signal). Next, current detector and timer 50 outputs a pin fraud present signal to announcing unit 54 and at the same time starts an internal timer. The announcer unit outputs an announcement to the coin station user saying in effect that a pin fraud ground has been detected and that if the detected pin fraud ground continues, any call from the coin telephone will be terminated. The announcement unit may use a digital or analog recorded voice message, a wavetable representation of a voice message, or even speech synthesis to make the announcement. While the announcement is being given and for a few seconds later, the timer runs to its limit. When that limit is reached, if the current detector and timer 50 detects a fraud ground, the call from the coin telephone is terminated. For either the fraud or the on-hook condition, it is appropriate to remove service and tear down the call until the next call is attempted. Hopefully, the announcement will have encouraged the caller to remove the fraud ground and when the timer has run its limit the current detector and timer 50 will no longer detect a fraud ground and a normal coin telephone call results. Besides a normal coin telephone call as the post announcement result, hopefully the pin fraud instrumentalities will be removed and the caller will be discouraged from using them again.

FIG. 2 shows a method 200 according to the operation of the present invention to prevent and discourage the defrauding of coin telephones. Referring to both FIGS. 1 and 2, the method of preventing pin fraud will be explained. The method 200 includes the step 202 of pre-determining a threshold minimum loop current for a properly operating coin telephone call. The next step 204 tests to determine if loop closure current is flowing, i.e. an off-hook condition has occurred at the coin telephone 40. If the result is no loop closure current, step 204 re-cycles to test again for loop closure. If the result is loop closure current is flowing, the method 200 proceeds to step 206. Step 206 sets up a call with coin telephone 40. This set up includes the sourcing of the normal d.c. loop current from ground terminal 21 under the control of drivers 25 and 26. Once the call is set up, step 208 detects the loop current flowing from ground terminal 21 using the current sensor portion of the current detector 50. Next, step 210 compares the amount of loop current flowing from ground terminal 21 with the pre-determined threshold minimum loop current. If the amount of loop current is equal to or greater than the threshold minimum loop current, the method 200 re-cycles to step 208 to periodically test for pin fraud for the duration of the call. If the loop current is less than the threshold minimum loop current, the method 200 proceeds to step 210. At step 210 the comparison of the loop current flowing from ground terminal 21 has fallen below the pre-determined threshold minimum loop current and that indication from current detector and timer 50 instructs announcement unit 54 to play a fraud ground detected announcement at step 212. The current detector and timer 50 also instructs a timer therein to start running to a predetermined limit at step 214. When the timer reaches the predetermined limit, step 216 of method 200 detects the loop current again, and proceed to step 218. If at step 218 the loop current is not less than the threshold minimum loop current, the method 200 proceeds back to step 216. At step 218 if the comparison of the loop current flowing from ground terminal 21 has fallen below the pre-determined threshold minimum loop current, an indication from current detector and timer 50 will instruct switch 20 to terminate the present call with coin telephone 40. This termination can be by operation of electrical signals directly on the conditioning circuit 22 or the driver circuit 24, or by setting a software readable logic level which instructs the switch 20 to terminate and tear down the call as if there had been a normal hang-up of the handset 48.

It is worth noting that method 200 will arrive at termination step 220 because a pin fraud at coin telephone was detected, or because the party at coin telephone 40 placed the handset 48 on-hook in a normal termination. Either case will cause the loop current flowing from ground terminal 21 to go to a very small value. Thus, the pin fraud detecting method 200 uses an existing call termination sequence and after the detection steps does not require any special treatment. Since step 220 termination treats the end of the call as a normal termination, method 200 returns to step 204 to test for the start of a next call. If a pin fraud is not removed after termination at step 220, a subsequent termination by operation of the steps 204–220 will quickly follow, thereby preventing and discouraging a subsequent pin fraud.

Thus, it will now be understood that there has been disclosed a method and apparatus for reducing revenues losses from pin fraud. While the invention has been particularly illustrated and described with reference to preferred embodiments thereof, it will be understood by those skilled in the art that various changes in form, details, and applications may be made therein. For example, the timer could be a separate unit and located with or after the announcement unit and still perform the steps of the method according to the present invention. It is accordingly intended that the appended claims shall cover all such changes in form, details and applications which do not depart from the true spirit and scope of the invention.

What is claimed is:

1. An apparatus for reducing coin telephone fraud comprising:

a local telecommunications switch having a tip conductor and a ring conductor;

means for detecting an amount of current sourced from a telecommunication switch to a tip driver and comparing that amount of current with a predetermined threshold current, and if the detected amount of current sourced from within the telecommunication switch to the tip driver is less than the predetermined threshold current then a pin fraud ground current at the coin telephone has been determined; and an announcing unit announcing to the coin telephone that a pin fraud ground has been detected and that if the detected pin fraud ground continues, any call from the coin telephone will be terminated.

2. Apparatus according to claim 1, wherein said detecting means includes a timer that delays termination of the present call from the coin telephone for a set period of time to allow time for the detected pin fraud to be discontinued.

3. Apparatus according to claim 2, wherein said set period of time is at least two seconds.

4. Apparatus for announcing detection of an improper ground and impending termination of a telephone call comprising:

a ground connection terminal;

means for detecting current having a first lead connected to said first ground terminal and a second lead;

a ring voltage driver having a more positive input connected to said second lead of said current detecting means, a less positive input connected to a more negative voltage; and a ring driver output;

a tip voltage driver having a more positive input connected to said second lead of said current detecting means, a less positive input connected to said more negative voltage, and a tip driver output;

a first current loop detecting impedance having a first lead connected to said tip driver output and a second lead;

a tip conductor having a connection to said second lead of said first loop current detecting impedance;

a second current loop detecting impedance having a first lead connected to said ring driver output and a second lead;

a ring conductor having a connection to said second lead of said second loop current detecting impedance;

a coin telephone having a first terminal connected to said tip conductor and a second terminal connected to said ring conductor;

said current detecting means for detecting an unauthorized connection between said tip conductor and ground;

announcing unit connected to said current detecting means for announcing to said coin telephone that an improper ground has been detected and that any present call to the coin telephone will be discontinued if the unauthorized connection continues for a set period of time;

a timer connected to said current detecting means for timing said set period if an improper ground is detected by said detecting means; and means for discontinuing a telephone call to said coin telephone if the current detecting means detects an improper ground when the timer reaches the set period.

5. Apparatus according to claim 4, wherein said unauthorized connection that is detected by said current detecting means is caused by equipment failure and service to said coin telephone is discontinued.

6. Apparatus according to claim 4, wherein said unauthorized connection that is detected by said current detecting means is a fraud connection for preventing said coin telephone from operationally receiving a fee-for-service charging pulse, and coin telephone service is discontinued if the fraud condition exists when the set period of time is over.

7. A method of detecting, at a telecommunication switch, a service fee collection disabling ground current at a telephone at a location that is remote to the telecommunication switch comprising the steps of:

determining a threshold loop current that is the lowest average amount of current that flows in a normal loop for an off-hook condition of the telephone;

detecting an average amount of current that flows in a present loop for an off-hook condition of the telephone;

comparing said lowest average amount of current of said normal loop with said amount of current of said present loop for an off-hook condition of the telephone and if said amount of current of said present loop is lower then detecting a fee collection disabling ground and providing a detected-fee-collection-disabling-ground signal;

announcing to said telephone that said fee-collection-disabling-ground has been detected and if said ground exists after a set period of time any call to said telephone will be disconnected;

timing said set period of time upon detecting said ground; and disconnecting any call with said telephone if said ground exists after said set period of time.

* * * * *